United States Patent
Karaoguz et al.

(10) Patent No.: US 9,173,163 B2
(45) Date of Patent: Oct. 27, 2015

(54) ALTERING COMMUNICATION INTERFACE PARAMETERS BASED UPON MOBILITY

(75) Inventors: Jeyhan Karaoguz, Irvine, CA (US); James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 799 days.

(21) Appl. No.: 11/715,560

(22) Filed: Mar. 8, 2007

(65) Prior Publication Data
US 2008/0056212 A1    Mar. 6, 2008

Related U.S. Application Data

(60) Provisional application No. 60/842,231, filed on Sep. 5, 2006.

(51) Int. Cl.
*H04W 48/18* (2009.01)
*H04W 36/32* (2009.01)

(52) U.S. Cl.
CPC .............. *H04W 48/18* (2013.01); *H04W 36/32* (2013.01)

(58) Field of Classification Search
CPC .............................. H04W 36/32; H04W 48/18
USPC ............... 370/329, 331–334; 455/422, 404.2, 455/422.1, 436–444, 456.2–457, 572–574
See application file for complete search history.

(56) References Cited

U.S. PATENT DOCUMENTS

| | | | |
|---|---|---|---|
| 5,914,668 A * | 6/1999 | Chavez, Jr. et al. | 340/7.39 |
| 6,263,190 B1 * | 7/2001 | Mamori et al. | 455/67.11 |
| 6,377,813 B1 * | 4/2002 | Kansakoski et al. | 455/522 |
| 6,490,460 B1 * | 12/2002 | Soliman | 455/522 |
| 6,970,708 B1 * | 11/2005 | Raith | 455/440 |
| 6,973,316 B1 * | 12/2005 | Hayakawa | 455/456.1 |
| 7,447,226 B2 * | 11/2008 | Bivens et al. | 370/429 |
| 7,565,676 B2 * | 7/2009 | Bell | 725/105 |
| 2004/0235479 A1 * | 11/2004 | Cho et al. | 455/441 |
| 2005/0048977 A1 * | 3/2005 | Dorenbosch et al. | 455/441 |
| 2006/0092875 A1 * | 5/2006 | Yang et al. | 370/329 |
| 2006/0199591 A1 * | 9/2006 | Klatt | 455/450 |

(Continued)

OTHER PUBLICATIONS

Universal Mobile Telecommunications Systme (UMTS); User Equipment (UE) procedures in idle mode and procedures for cell reselection in connected mode. 3GPP TS 25.304 version 6.6.0 Release 6). Jun. 2005. Section 5.2, pp. 14-29.*

*Primary Examiner* — George Eng
*Assistant Examiner* — Marcus Hammonds
(74) *Attorney, Agent, or Firm* — Garlick & Markison; Kevin L. Smith

(57) ABSTRACT

Altering communication interface parameters based upon mobility. A novel approach is presented in which at least one operational parameter is changed as a function of the mobility of a wireless terminal. The changing of the operational parameter (which can be performed by either the wireless terminal, a WAP, or cooperatively by both) can include changing an entire protocol or only one operational parameter within the protocol. The mobility measure can be any one or combination of velocity (rate of change of position), acceleration, position within the network, or other measure. The mobility can be an average mobility over a period of time, or it can be an instantaneous mobility. The operational parameter can be changed by either communication device at each end of a communication link or in part, by both (e.g., either by a WAP (Wireless Access Point) or a communication device connected thereto, or by cooperation there between).

26 Claims, 15 Drawing Sheets

(56) References Cited

U.S. PATENT DOCUMENTS

| | | | |
|---|---|---|---|
| 2007/0008929 A1* | 1/2007 | Lee et al. | 370/331 |
| 2007/0165583 A1* | 7/2007 | Pecen | 370/338 |
| 2007/0258408 A1* | 11/2007 | Alizadeh-Shabdiz et al. | 370/331 |
| 2008/0057865 A1* | 3/2008 | Bennett | 455/39 |

* cited by examiner

ALTERING COMMUNICATION INTERFACE PARAMETERS BASED UPON MOBILITY

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 60/842,231, entitled "Altering communication interface parameters based upon mobility,", filed Sep. 5, 2006, expired.

BACKGROUND OF THE INVENTION

1. Technical Field of the Invention

The invention relates generally to communication networks; and, more particularly, it relates to selective modification of one or more operational parameters employed to govern wireless communication between a wireless terminal and a WAP (Wireless Access Point).

2. Description of Related Art

Communication systems are known to support wireless and wire lined communications between wireless and/or wired communication devices. Such communication systems range from wide area cellular data and voice systems to the local area or personal area wireless networks supporting Internet or other point to point connectivity. Each type of communication system is constructed, and hence operates, in accordance with one or more communication standards. For instance, wireless communication systems may operate in accordance with one or more standards including, but not limited to, IEEE 802.11, IEEE 802.16, Bluetooth®, advanced mobile phone services (AMPS), digital AMPS, global system for mobile communications (GSM), code division multiple access (CDMA), local multi-point distribution systems (LMDS), multi-channel-multi-point distribution systems (MMDS), mobile WiMAX (Worldwide Interoperability for Microwave Access) systems, other types of mobile or wireless systems, and/or variations thereof.

Depending on the type of wireless communication system, a wireless communication device, such as a cellular telephone, two-way radio, personal digital assistant (PDA), personal computer (PC), laptop computer, home entertainment equipment, etc. communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them or some combination thereof to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802,11b, or 802.11g employ SISO wireless communications.

Other types of wireless communications include multiple-input-single-output (MISO) and multiple-input-multiple-output (MIMO). For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

Within many communication systems, including those in which one or more devices therein are wireless in nature, a communication device that connects to one or more networks via a WAP (Wireless Access Point) is oftentimes mobile. That is to say, the communication device may connect to a communication network via a first WAP at a first time, and then via a second WAP at a second time. Moreover, the communication device may even change the WAP through which it is connected to the communication network in real time (e.g., as the communication device is undergoing movement).

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
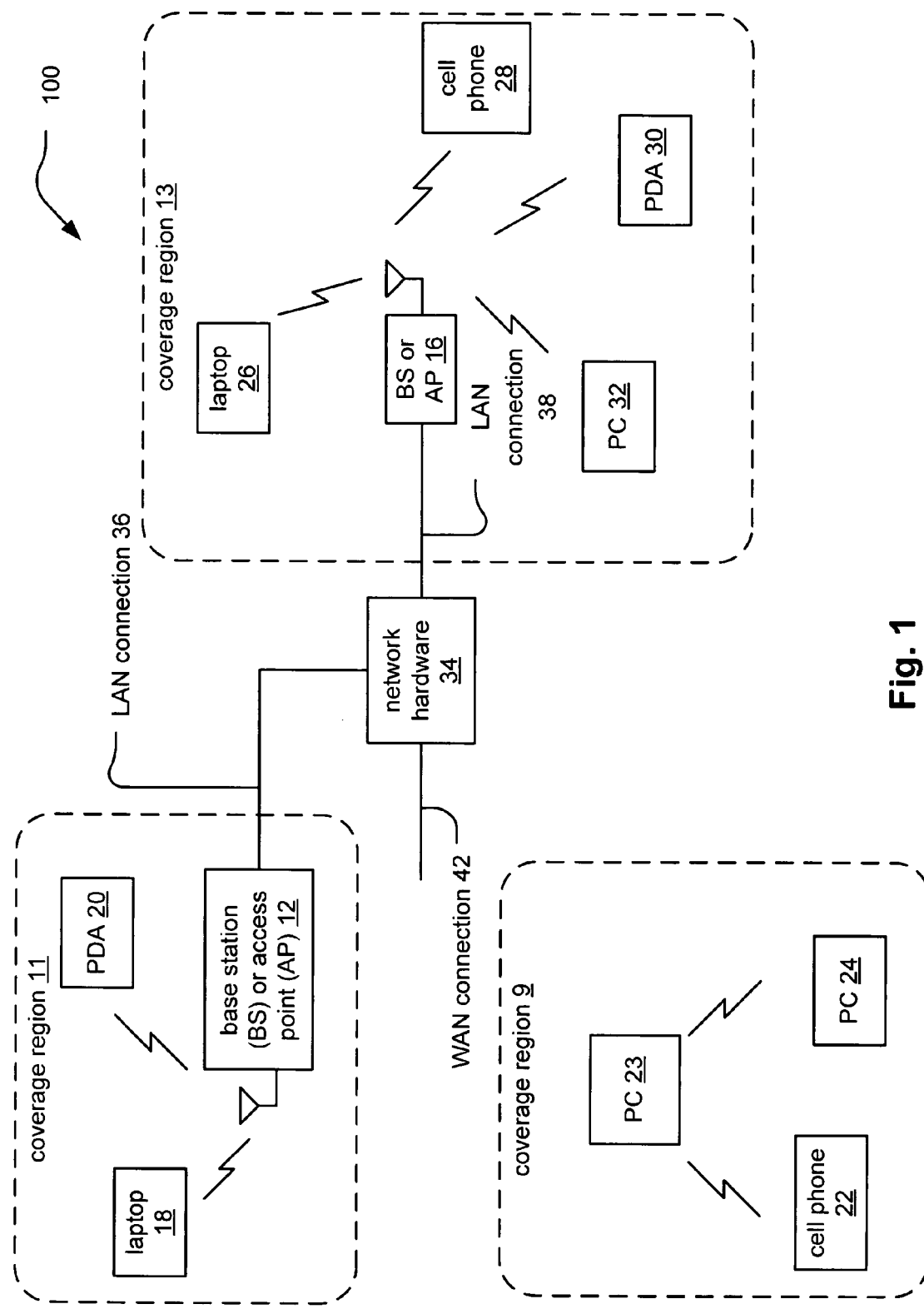
FIG. 1 is a diagram showing an embodiment of a wireless communication system.

A means is presented by which one or more operational parameters that govern communication between a wireless terminal and a WAP (Wireless Access Point) is changed as a function of mobility of the wireless terminal with respect to any one or more WAPs. The initiation of the changing of one or more operational parameters that governs communication between a wireless terminal and a WAP can be (1) initiated by the wireless terminal, (2) initiated by the WAP, or (3) cooperatively performed by both the wireless terminal and the WAP. Generally speaking, the changing of at least one operational parameter is performed based on the mobility of the wireless terminal.

It also is noted here that a WAP can provide support for any one or all of a local area network (LAN) such as a wireless local area network (WLAN), a personal area network (PAN), a wide area network (WAN), or any other type of network of interest. When more than one WAP is detected, the wireless terminal can select an appropriate WAP through which to connect to a communication network of interest. In addition, the operational parameters employed to govern the communication link between the wireless terminal and the WAP can be a predetermined group of operational parameters, or they can be selected by either one or both of the wireless terminal and the WAP. In some embodiments, the communication network of interest is the Internet itself. The communication network can be a packet switched communication network.

Based on the mobility of the wireless terminal, the wireless terminal selects an appropriate WAP through which to achieve a pathway to the communication network of interest. The mobility of the wireless terminal can be viewed as being the rate of change of location (e.g., speed) of the wireless terminal or a location/position within a particular network, or a combination thereof. For example, the network may include one or more dead spots (with little or no network coverage), and when the location of the wireless terminal is in such a dead spot, the mobility of the wireless terminal can indicate this. There may be instances where a number of available WAPs are detected by the wireless terminal, and the wireless terminal may even be able to associate with many of those detected WAPs, but the wireless terminal appropriately selects one of the WAPs as being more ideal than the other WAPs through which to connect to the communication network.

Additional considerations besides only mobility of the wireless terminal can also be employed in the decision making of which of the operational parameters can or should be changed based on the wireless terminal's mobility. Some of these considerations can include distance between the wireless terminal and the WAPs, the signal strength or signal quality provided via the connection between the wireless terminal and the WAPs, the means of communication (e.g., protocol, standard, or other parameters), the modulation type, code rate, and/or any other parameter that governs the communication link between the wireless terminal and the WAPs.

FIG. 1 is a diagram showing an embodiment of a communication system 100 that includes a plurality of base stations and/or access points 12, 16, a plurality of wireless communication devices 18-32 and a network hardware component 34. Note that the network hardware 34, which may be a router, switch, bridge, modem, system controller, etc. provides a wide area network connection 42 for the communication system 100. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices are described in greater detail with reference to FIG. 2.

Wireless communication devices 22, 23, and 24 are located within a coverage region 9 within the communication system 100. This communication system 100 can be implemented as any one of variety of communication systems including, though not limited to, IEEE 802.11, IEEE 802.16, Bluetooth®, advanced mobile phone services (AMPS), digital AMPS, global system for mobile communications (GSM), code division multiple access (CDMA), local multi-point distribution systems (LMDS), multi-channel-multi-point distribution systems (MMDS), mobile WiMAX (Worldwide Interoperability for Microwave Access) systems, other types of mobile or wireless systems, and/or variations thereof. In one embodiment, these communication devices 22, 23, and 24 may only communicate with each other. In an alternative embodiment, to communicate with other wireless communication devices within the communication system 100 or to communicate outside of the communication system 100, the communication devices 22, 23, and/or 24 need to affiliate with one of the base stations or access points 12 or 16 (e.g., one of the WAPs within the communication system 100).

The base stations or access points 12, 16 are located within coverage regions 11 and 13, respectively, within the communication system 100, and are coupled to the network hardware 34 via local area network connections 36, 38. Such a connection provides the base station or access point 12 or 16 (e.g., WAP 12 or WAP 16) with connectivity to other devices within the communication system 100 and provides connectivity to other networks via the WAN connection 42. To communicate with the wireless communication devices within its particular coverage region 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 100.

In some embodiments, base stations are used for cellular telephone systems and like-type systems, while access points are used for in-home or in-building wireless networks (e.g., IEEE 802.11, IEEE 802.16, and versions thereof, Bluetooth®, and/or any other type of radio frequency based network protocol). Regardless of the particular type of communication system, each wireless communication device includes a built-in radio and/or is coupled to a radio.

Figure 2:
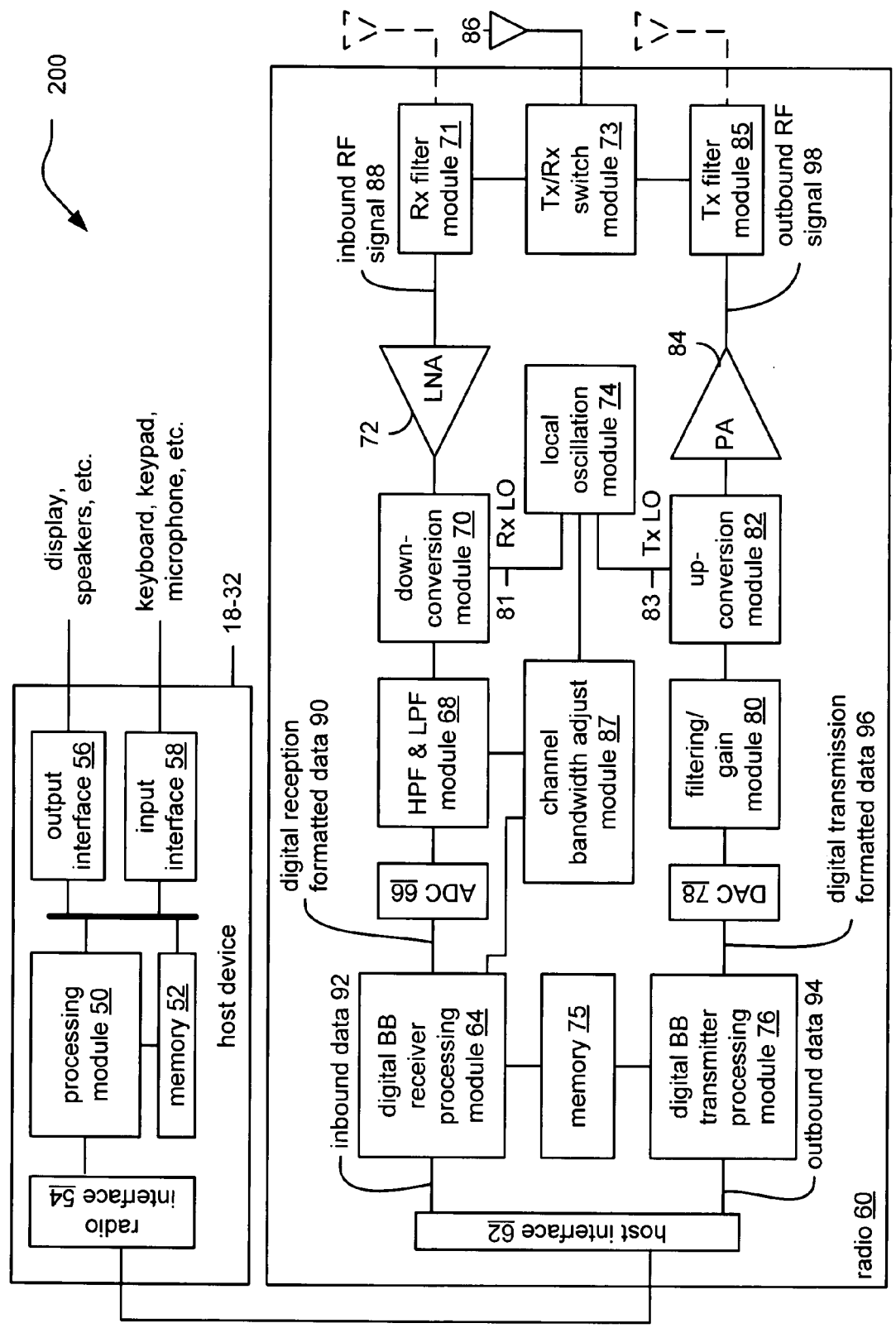
FIG. 2 is a diagram showing an embodiment of a wireless communication device.

FIG. 2 is a diagram showing an embodiment of a wireless communication device 200 that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a high pass and low pass filter module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a channel bandwidth adjust module 87, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device 200 is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation de-mapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, IEEE 802.16, Bluetooth®, etc.) to produce outbound baseband signals 96. The outbound baseband signals 96 will be digital base-band signals (e.g., have a zero IF) or digital low IF signals, where the low IF typically will be in the frequency range of one hundred kHz (kilo-Hertz) to a few MHz (Mega-Hertz).

The digital-to-analog converter 78 converts the outbound baseband signals 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device 200.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The high pass and low pass filter module 68 filters, based on settings provided by the channel bandwidth adjust module 87, the inbound low IF signals or the inbound baseband signals to produce filtered inbound signals.

The analog-to-digital converter 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kHz to a few MHz. The digital receiver processing module 64, based on settings provided by the channel bandwidth adjust module 87, decodes, descrambles, de-maps, and/or demodulates the inbound baseband signals 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device 200 of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
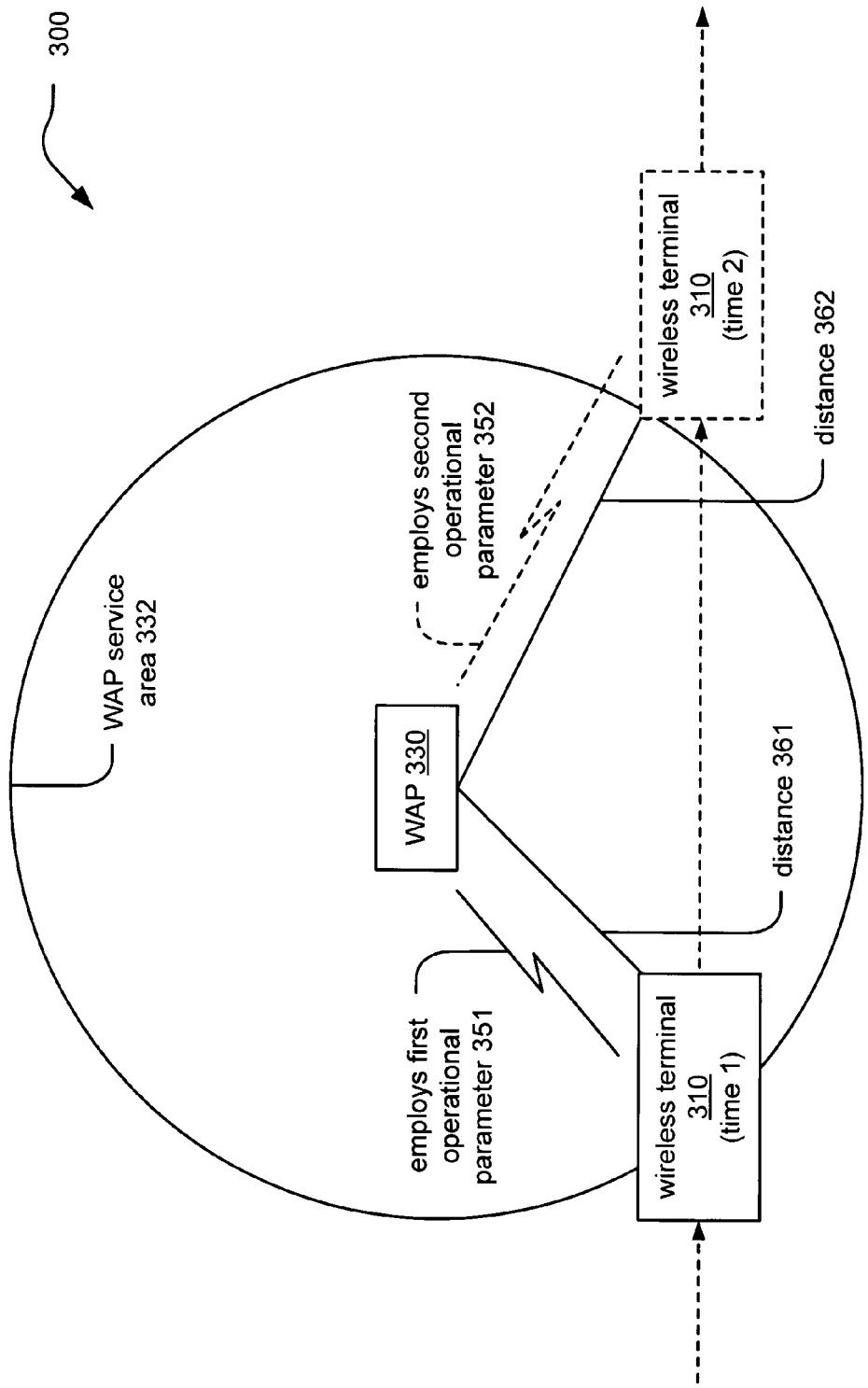
FIG. 3 is a diagram showing an embodiment of a communication system that includes a communication device, whose position changes as a function of time, and a WAP to which the communication device connects by employing at least two different operational parameters as a function of time.

FIG. 3 is a diagram showing an embodiment of a communication system 300 that includes a wireless terminal 310, whose position changes as a function of time, and a WAP 330 to which the wireless terminal 310 connects by employing at least two different operational parameters as a function of time. That is to say, the wireless terminal 310 is operable to employ at least a first operational parameter at a time 1 (see reference numeral 351), and at least a second operational at a time 2 (see reference numeral 352). Certain other operational parameters employed to facilitate the communication between the WAP 330 and the wireless terminal 310 may remain the same, but at least one operational parameter that governs the communication link between the WAP 330 the wireless terminal is changed between the time 1 and the time 2. As can be seen, the wireless terminal 310 changes position from the time 1 to the time 2, and a first distance 361 exists between the WAP 330 and the wireless terminal 310 at time 1, and a second distance 362 exists between the WAP 330 and the wireless terminal 310 at time 2.

It is noted that the WAP 330, or any other WAP described herein, can be a wireless local area network access point that is compatible with the IEEE 802.11 standard. Alternatively, any WAP described herein can be a WiMAX access point that is compatible with the IEEE 802.16 standard. In even other embodiments, any WAP described herein can be a cellular WAP or other type or WAP that is operable to allow wireless connectivity therewith.

The WAP 330 provides the ability for a wireless terminal to connect thereto within its WAP service area 332. In this embodiment, as the wireless terminal 310 passes through the WAP service area 332, at least one operational parameter that governs the communication between the WAP 330 and the wireless terminal 310 is changed as a function of time. This changing of the operational parameter from the first operational parameter to the second operational parameter can be performed based on the mobility of the wireless terminal 310. For example, when a rate of change of position of the wireless terminal 310 with respect to the WAP 330 is greater than a threshold (which can be predetermined, fixed, or adaptively determined), then the at least one operational parameter is changed. In even other embodiments, the rate of change of position of the wireless terminal 310 can be an absolute rate of change of the wireless terminal 310 on the face of the Earth (i.e., without respect to the WAP 330) such as could determined using GPS (Global Positioning System).

The mobility of wireless terminal 310 can be viewed as being velocity, exact position, or a combination thereof. For example, the mobility of the wireless terminal 310 indicates whether or not the wireless terminal 310 is situated within a dead spot of the WAP service area 332 (e.g., an area with little or no coverage). From one perspective, the velocity component of the mobility of wireless terminal 310 can be viewed as being a first order change of position time derivative. If desired, additional considerations can be employed within the mobility parameter of the wireless terminal 310 including a second order change of position time derivative (i.e., acceleration).

Generally speaking, this velocity, position within the wireless network, and/or a combination thereof, can be viewed as being the mobility of the wireless terminal 310 which can again be with respect to the WAP 330 (e.g., a relative mobility) or it can be an absolute mobility of the wireless terminal 310 on the face of the Earth. The mobility of the wireless terminal 310 can be viewed as being an average mobility over a period of time (the length of which can be predetermined or adaptively determined based on other considerations), or an instantaneous mobility.

If desired, additional considerations can also be added to the decision of changing at least one operational parameter. For example, the distance between the wireless terminal 310 and the WAP 330 can also be considered when making a decision to change an operational parameter in addition to the mobility of the wireless terminal 310. Moreover, based on the mobility of the wireless terminal 310, the operational parameter may be changed to a particularly suitable value based on the particular mobility of the wireless terminal 310. For example, the actually mobility of the wireless terminal 310 can be characterized as being within one of a plurality of ranges (e.g., between value 1 and value 2, or between value 2 and value 3, etc.). Based on which range the mobility of the wireless terminal 310 falls into, the change to the operational parameter can be made accordingly. Looking at one possible implementation, when the mobility of the wireless terminal 310 is between value 1 and value 2, then an operational parameter 1 could be changed to an operational parameter 2. Alternatively, when the mobility of the wireless terminal 310 is between value 2 and value 3, then the operational parameter 1 could be changed to an operational parameter 3, and so on. There may be instances where the mobility is less than a particular value, and no operational parameter undergoes any changing.

A designer is provided a wide variety of options in implementation, and generally speaking, when the mobility of the wireless terminal 310 changes, then at least one operational parameter that governs the communication between the WAP 330 and the wireless terminal 310. Some examples of operational parameters include packet size, modulation type (e.g., QPSK, 8-PSK, 16 QAM, etc.), code rate, coding type (e.g., LDPC (Low Density Parity Check) coding, turbo coding, TCM (Trellis Coded Modulation), etc.), MIMO configuration parameters, beamforming parameters, or some other operational parameter such as with which standard the communication is being governed (e.g., according to IEEE 802.11, IEEE 802.16, or any variant thereof).

Based on the mobility of the wireless terminal 310, the communication between the wireless terminal 310 and the WAP 330 can be modified. For example, more robust communication can be employed (e.g., including any one of a lower order modulation, a first coding type, a lower code rate, and so on) when the mobility of the wireless terminal 310 is within a first range. Then, when the mobility of the wireless terminal 310 is within a second range, relatively less robust communication can be employed (e.g., including any one of a higher order modulation, a second coding type, a higher code rate, and so on) that can allow greater throughput.

Figure 4:
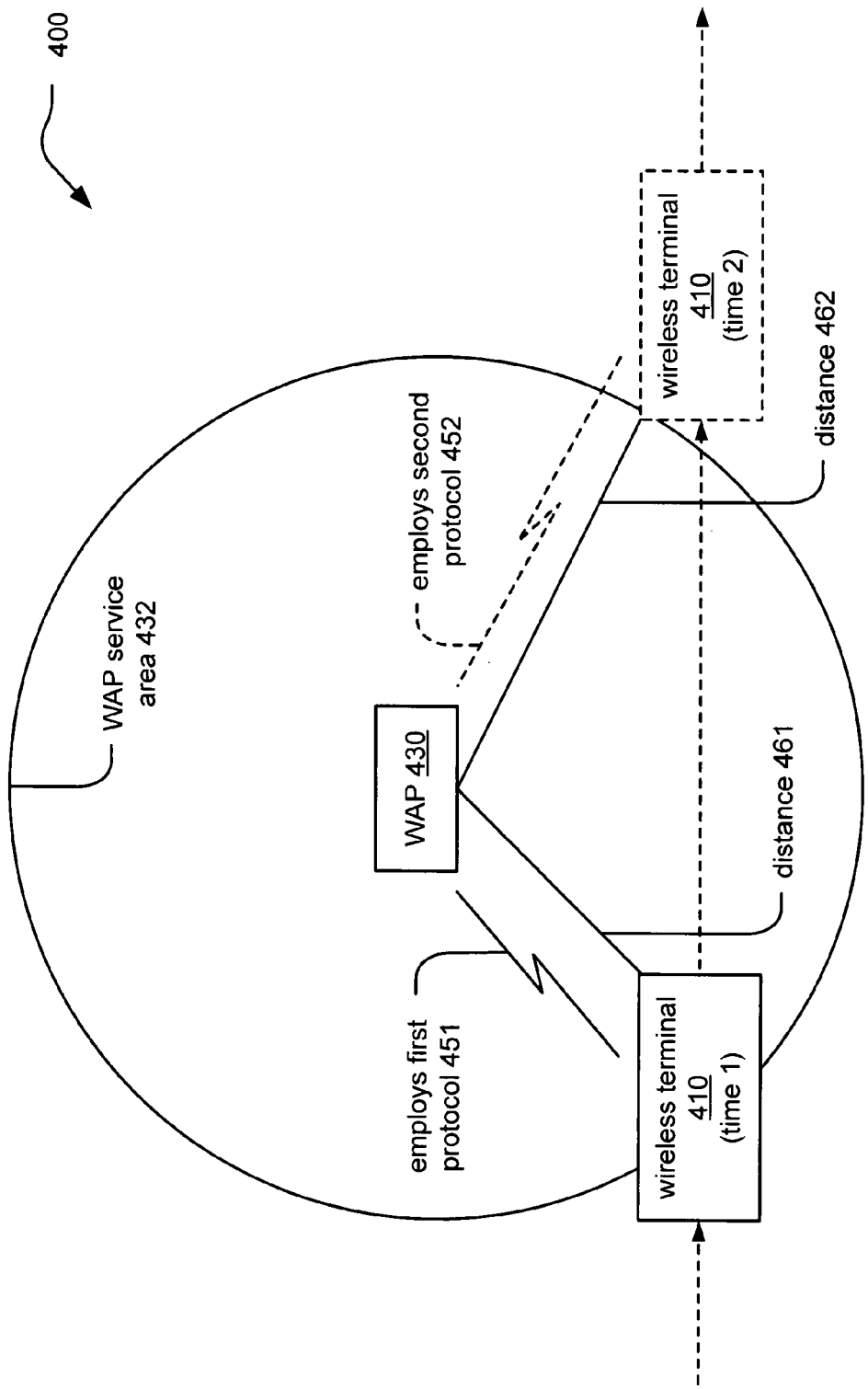
FIG. 4 is a diagram showing an embodiment of a communication system that includes a communication device, whose position changes as a function of time, and a WAP to which the communication device connects by employing at least two different protocols as a function of time.

FIG. 4 is a diagram showing an embodiment of a communication system 400 that includes a wireless terminal 410, whose position changes as a function of time, and a WAP 430 to which the wireless terminal 410 connects by employing at least two different protocols as a function of time. Analogous to the previous diagram, the WAP 430 of this embodiment includes a WAP service area 432, and the wireless terminal 410 is located at a first location at a first time and located at a second location at a second time. Also, when the wireless terminal 410 is located at the first location at the first time, a distance 461 separates the wireless terminal 410 and the WAP 430. When the wireless terminal 410 is located at the second location at the second time, a distance 462 separates the wireless terminal 410 and the WAP 430.

At a first time, the communication between the WAP 430 and the wireless terminal 410 is governed using a first protocol (see reference numeral 451), and at a second time, the communication between the WAP 430 and the wireless terminal 410 is governed using a second protocol (see reference numeral 452). Based on the mobility of the wireless terminal 410, not only is one operational parameter changes, but the entire protocol that governs communication between the WAP 430 and the wireless terminal 410 is changed. Although, it is also noted that a difference between a first protocol and a second protocol can be as little as only one operational parameter. Generally, more than one operational parameter is different when comparing two separate protocols, but there may be instances where as little as only one operational parameter is different (e.g., only modulation type or only code rate, etc.).

Figure 5:
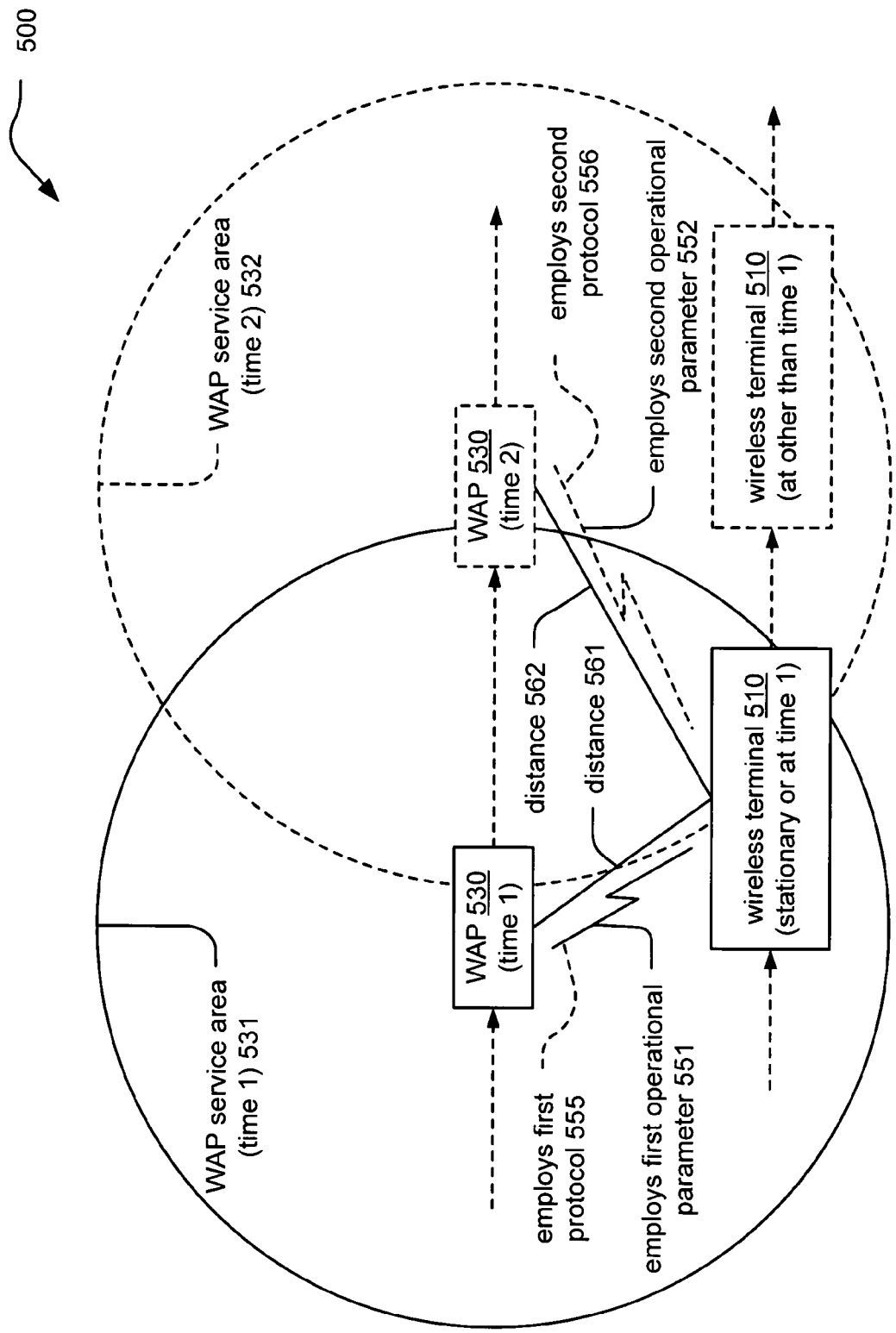
FIG. 5 is a diagram showing an embodiment of a communication system that includes a communication device and a WAP, whose position changes as a function of time, to which the communication device connects by employing at least two operational parameters as a function of time.

FIG. 5 is a diagram showing an embodiment of a communication system 500 that includes a wireless terminal 510 and a WAP 530 (whose position could possibly change as a function of time) to which the wireless terminal 510 connects by employing at least two operational parameters as a function of time. In this embodiment, it is the WAP 530 that changes position (i.e., has mobility). There can be instances where a WAP can be housed or implemented within a mobile device; some possible examples include when a WAP is positioned within a moving apparatus such as a train or other vehicle. Alternatively, a user (e.g., individual person) could possibly be carrying a wireless terminal that is operating as the WAP 530.

The wireless terminal 510 may also have mobility, in which case both the WAP 530 and the wireless terminal 510 are mobile, and the relative mobility there between can be more dynamic than when only one of the respective devices is mobile.

As can be seen, when the WAP 530 is located in a first location at a first time, then a first WAP service area 531 generated thereby has a first proximity. Then, when the WAP 530 is located in a second location at a second time, then a second WAP service area 532 (generated by the WAP 530 in its location at the second time) has a second proximity. The wireless terminal 510 can be stationary (i.e., having a static position), or it also can have mobility such that the wireless terminal 510 is in a first location at a first time, and in a second location at a second time. It is noted that this second time with respect to the mobility of the wireless terminal 510 need not be the "second time" from the perspective of the WAP 530; in other words, the mobility of the wireless terminal 510 may be viewed such that the wireless terminal 510 is in a first location at a first time, and in a second location at a time that is other than the first time (but not necessarily the second time at which the WAP 530 generates the WAP service area 532).

Somewhat analogous to some of the previous embodiments, when the WAP 530 is located at the first location at the first time, a distance 561 separates the wireless terminal 510 and the WAP 530. When the WAP 530 is located at the second location at the second time, a distance 562 separates the wireless terminal 510 and the WAP 530. In situations where the wireless terminal 510 is also mobile, then these distances 561 and 562 can be changing even more.

At a first time, the communication between the WAP 530 and the wireless terminal 510 is governed using a first operational parameter (see reference numeral 551) or a first protocol (see reference numeral 555), and at a second time, the communication between the WAP 530 and the wireless terminal 510 is governed using a second operational parameter (see reference numeral 552) or a second protocol (see reference numeral 556). Based on the mobility of the WAP 530 (or both the WAP 530 and the wireless terminal 510), one operational parameter that governs the communication between the WAP 530 and the wireless terminal 510 can be changed. Alternatively, based on the mobility of the WAP 530 (or both the WAP 530 and the wireless terminal 510), the entire protocol that governs communication between the WAP 530 and the wireless terminal 510 can be changed.

Again, it is also noted that a difference between a first protocol and a second protocol can be as little as only one operational parameter. Generally, more than one operational parameter is different when comparing two separate protocols, but there may be instances where as little as only one operational parameter is different (e.g., only modulation type or only code rate, etc.).

Figure 6:
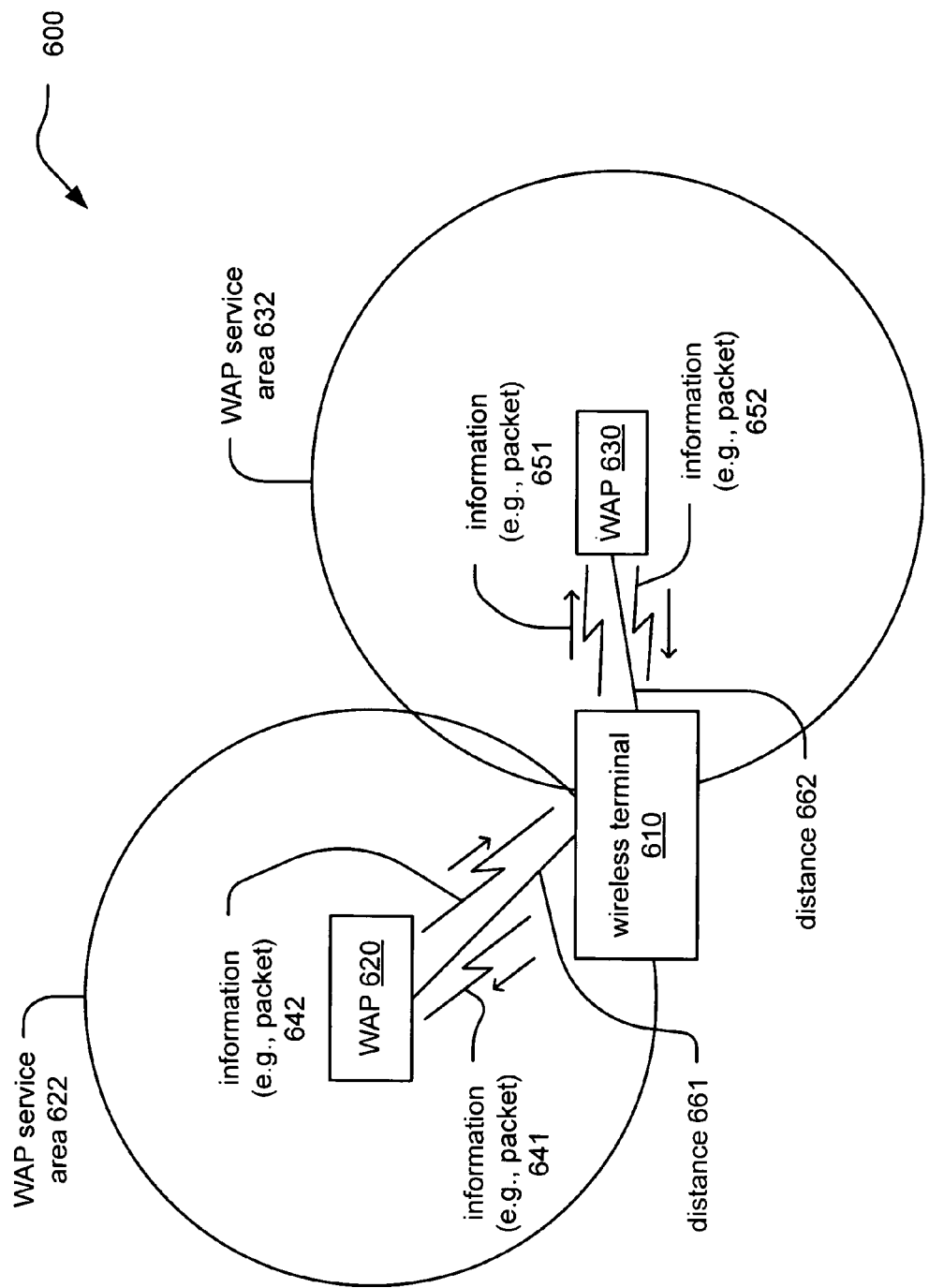
FIG. 6 is a diagram showing an embodiment of a communication system that includes a communication device and a plurality of WAPs that are operable to support bi-directional communication there between that can be employed for determining signal strength, communication link quality, or other operational and performance measures.

FIG. 6 is a diagram showing an embodiment of a communication system 600 that includes a wireless terminal 610 and a plurality of WAPs (i.e., WAP 620 and WAP 630 in this embodiment) that are operable to support bidirectional communication there between that can be employed for determining signal strength, communication link quality, or other operational and performance measures.

In this embodiment, first information (e.g., a packet in one embodiment) is transmitted in one direction along each communication link between the wireless terminal 610 and each WAP during a first time. Then, second information (e.g., a packet in one embodiment) is transmitted in the opposite direction along each communication link between the wireless terminal 610 and each WAP during a second time. The information packet may be transmitted from the wireless terminal 610 to a WAP during the first time, and the second information may be transmitted from that WAP to the wireless terminal 610 to a WAP during the second time. The converse may alternatively be employed. For example, the first packet may be transmitted from a WAP to the wireless terminal 610 during the first time, and the second packet may be transmitted from the wireless terminal 610 to that WAP during the second time.

Looking specifically at the diagram, first information 641 is transmitted in one direction along a communication link between the wireless terminal 610 and the WAP 620 during a first time, and second information 642 is transmitted in the opposite direction along the communication link between the WAP 620 and the wireless terminal 610 during a second time. Analogously, first packet 651 is transmitted in one direction along a communication link between the wireless terminal 610 and the WAP 630 during a first time, and second information 652 is transmitted in the opposite direction along the communication link between the WAP 630 and the wireless terminal 610 during a second time.

Regardless of which information transmission is first and which is second, a round trip communication between the wireless terminal 610 and each of the respective WAPs allows for an accurate determination of the signal strength, communication link quality, or other operational and performance measure of that corresponding communication link. This characterization can then be employed in the decision making processes regarding with which WAP the wireless terminal 610 should connect.

Using this bi-directional communication link characterization, then a device at one end of the communication link has knowledge of what is sent, and the device at the other end of the communication link will knowledge of what is received. Therefore, an accurate assessment of the various parameters of the communication link can be made. By using a bi-directional approach, then full information can be made available (i.e., what is sent and received in one direction, and what is sent and received in the other direction). Also, by using a bi-directional approach, then devices at both ends of the communication link can participate in the communication link characterization; for example, one device can perform a first portion of the characterization, and the other device can perform a second portion of the characterization.

In even another embodiment, singular information (or a singular packet) is only transmitted in one direction (e.g., from wireless terminal 610 to a WAP, or from that WAP to the wireless terminal 610), and the corresponding receiving device is operable to determine the signal strength, communication link quality, or other operational and performance measure of that corresponding communication link. While this uni-directional approach may be slightly less accurate, in some cases, than a system employing a bi-directional approach, it nevertheless shows how the characterization of the respective communication links, and their corresponding WAPs, within the communication system 600 can be achieved.

Based on this bi-directional communication between the wireless terminal 610 and each of the WAPs 620 and 630, a relative distance between the wireless terminal 610 and each of the WAPs 620 and 630 can be determined. For example, a time stamp can be attached when first information is transmitted from the wireless terminal 610 to each WAP, and based on the received time at each WAP, then the distance there between can be determined with knowledge of speed at which the wireless communication travels. Alternatively, each of the wireless terminal 610 and the WAPs 620 and 630 could each include some means to determine their absolute location on the face of the Earth (e.g., GPS (Global Positioning System)), and based on the information of the locations of the wireless terminal 610 and the WAPs 620 and 630, then the distances 661 and 662 can be determined. In addition, other means by which the relative distances between the wireless terminal 610 and the WAPs 620 and 630 can also be employed.

The distance measurements 661 and 662, as well as a first communication link quality between the wireless terminal 610 and the WAP 620 and a second communication link quality between the wireless terminal 610 and the WAP 630 can be employed to assist in the decision making of changing at least one operational parameter that governs the wireless communication between the wireless terminal 610 and the WAP 620 and/or the WAP 630. For example, the decision making of whether to change the at least one operational parameter can include additional constraints besides only the mobility of the wireless terminal 610 or one of the WAPs 620 and 630.

Figure 7:
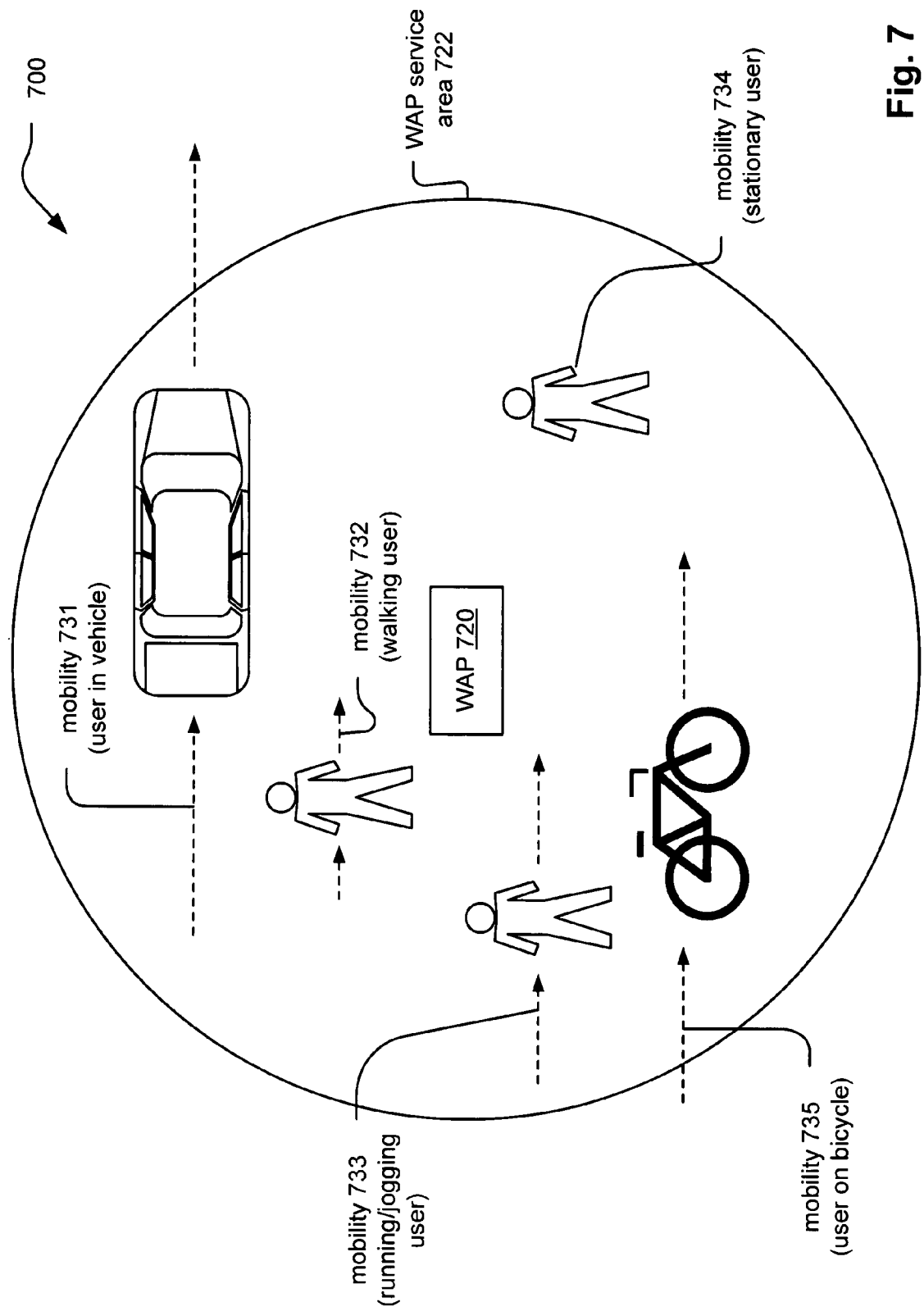
FIG. 7 is a diagram showing an embodiment of a communication system that includes a variety of different users and each user's respective mobility with respect to at least one WAP.

FIG. 7 is a diagram showing an embodiment of a communication system 700 that includes a variety of different users and each user's respective mobility with respect to at least one WAP. This embodiment includes a WAP 720. The WAP 720 has a WAP service area 722 in which each of the wireless terminals employed by each of the users depicted can detect the WAP 720 and connect to a communication network via the WAP 720.

As can be seen, each of the wireless terminals employed by the various users has a different mobility with respect to the WAP 720. A running/jogging user has a mobility 733 with respect to the WAP 720 that is certainly relatively greater than a stationary user who has a mobility 734 with respect to the WAP 720 or a walking user who has a mobility 732 with respect to the WAP 720. However, a user in a vehicle most likely has a mobility 731 with respect to the WAP 720 that any of these other users. A user on a bicycle has a mobility 735 that probably lies somewhere within the spectrum of the mobility 731 (at a higher end of the spectrum) to the mobility 734 (at the lower end of the spectrum).

If desired, based on a type of user, the mobility of that user can be categorized accordingly. For example, the running/jogging user has the mobility 733 which most likely be within a range that is more narrow than that of user in a vehicle that has the mobility 731. If the mobility of a user is to be characterized and then categorized into a range, then the sub-divided mobility ranges of the running/jogging user could be different than the sub-divided mobility ranges of the user in the vehicle. For example, if the mobility 733 of the running/jogging user is expected to be in the range from 0 to value 1, and the mobility of 731 of the user in the vehicle is expected to be in the range from 0 to value 2, and if the mobility range for each of these respective users is sub-divided into 6 sub-ranges, then each sub-range will be of a different size for each of the types of users. In a simplified, alternative embodiment, the type of user can be of no effect in the decision making of how to change the at least one operational parameter that governs communication between the WAP 720 and the wireless terminal of that user.

From another perspective, the type of a user can allow yet another degree by which decision making can be made with respect to the changing of the at least one operational parameter that governs communication between the user's wireless terminal and the WAP 720.

In addition, also depending on the type of a user, there may instances where certain types of users should not even connect to the WAP 720. It is noted that there will most likely be a different likelihood for each of these users, in having a different mobility, that connecting to a network via the WAP 720 is a most ideal connectivity. For example, there may be another WAP that is preferable for certain of these users than the WAP 720 depicted. There may be instances for some of these users in which their respective wireless terminal in fact detects the WAP 720, but after processing that user's mobility with respect to the WAP 720, that wireless terminal does not include the WAP 720 within a group of available WAPs to which the wireless terminal can connect. However, this WAP 720 may meet the decision making criterion or criteria for connecting therewith.

Figure 8:
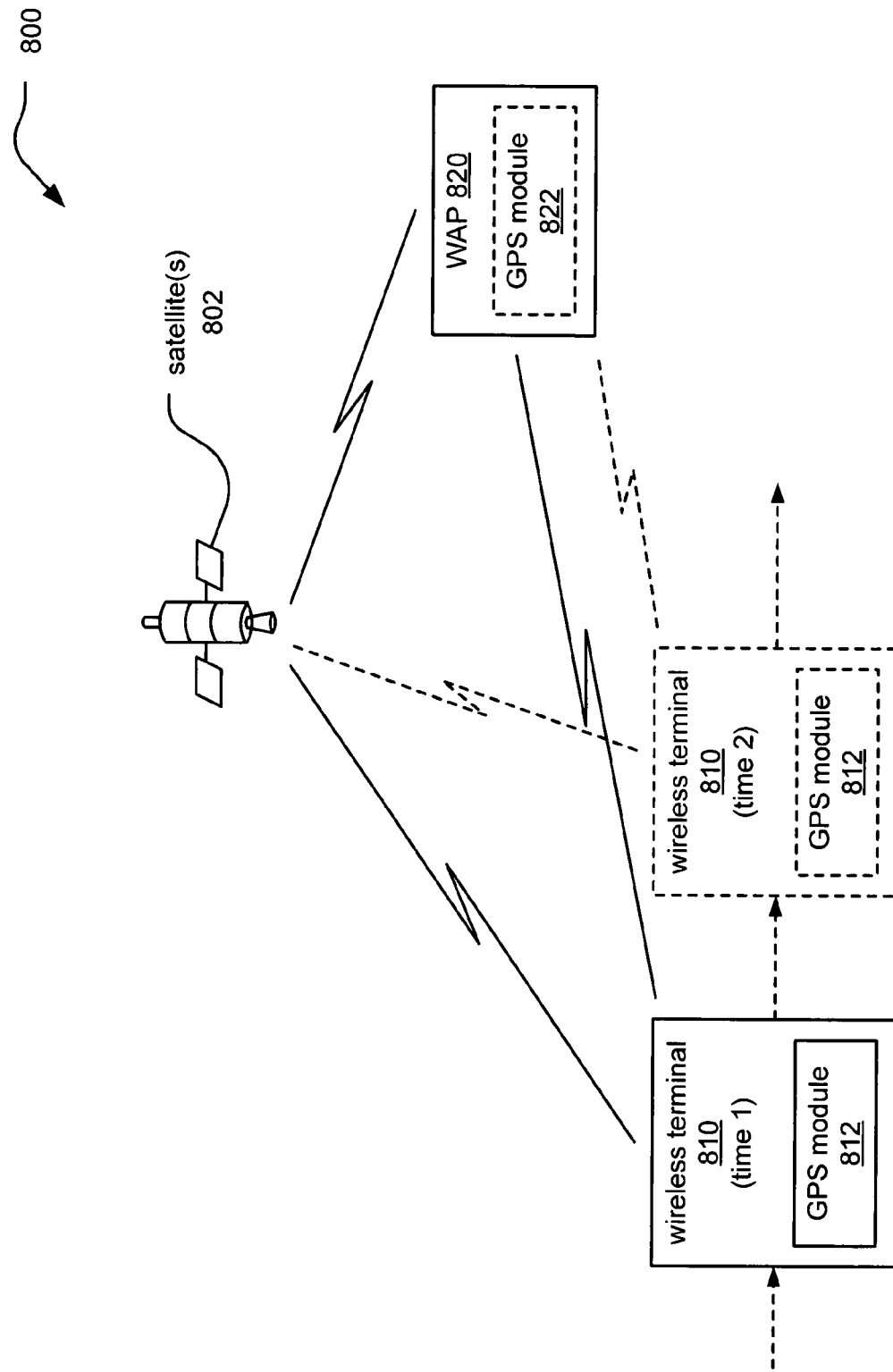
FIG. 8 is a diagram showing an embodiment of a communication system in which one apparatus or more includes a GPS (Global Positioning System) module.

FIG. 8 is a diagram showing an embodiment of a communication system 800 in which one apparatus or more includes a GPS (Global Positioning System) module. A GPS module is operable to communicate with one or more satellites 802 to determine its location on the face of the Earth. For example, a wireless terminal 810 includes a GPS module 812. A WAP 820 also can be implemented to include a GPS module 822.

In this embodiment, the wireless terminal 810 is shown as being in a first location at a first time, and at a second location at a second time. Using the GPS module 812, the mobility of the wireless terminal 810 can be determined in terms of its change of location as a function of time. If the WAP 820 also includes a GPS module 822, then the mobility (if any) of the WAP 820 can also be determined as function of time.

In certain embodiments, it can be merely the GPS module 822 of the wireless terminal 810 that is operable to determine the mobility of the wireless terminal 810. In embodiments in which the WAP 820 also include GPS module 822, then the WAP 820 can communicate information corresponding to its location on Earth to the wireless terminal 810. Using the information received from the WAP 820, the wireless terminal 810 then can use its own GPS provided information (i.e., from GPS module 812) and the information received from the WAP 820 corresponding to the location of the WAP 820, then the wireless terminal 810 can determine its relative position, rate of change of position, and/or relative mobility with respect to WAP 820.

It is noted that the GPS module within any apparatus in this diagram can be viewed as being a processing module that may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The GPS module can also have a memory coupled thereto. Such as memory device may be a single memory device or a plurality of memory devices. Such a memory device may be a read-only memory, random access memory, volatile memory, non-volatile memory, static memory, dynamic memory, flash memory, and/or any device that stores digital information. Note that when a processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Such a memory device is operable to store, and such a processing module is operable to execute, operational instructions corresponding to at least some of the steps and/or functions illustrated herein.

Figure 9:
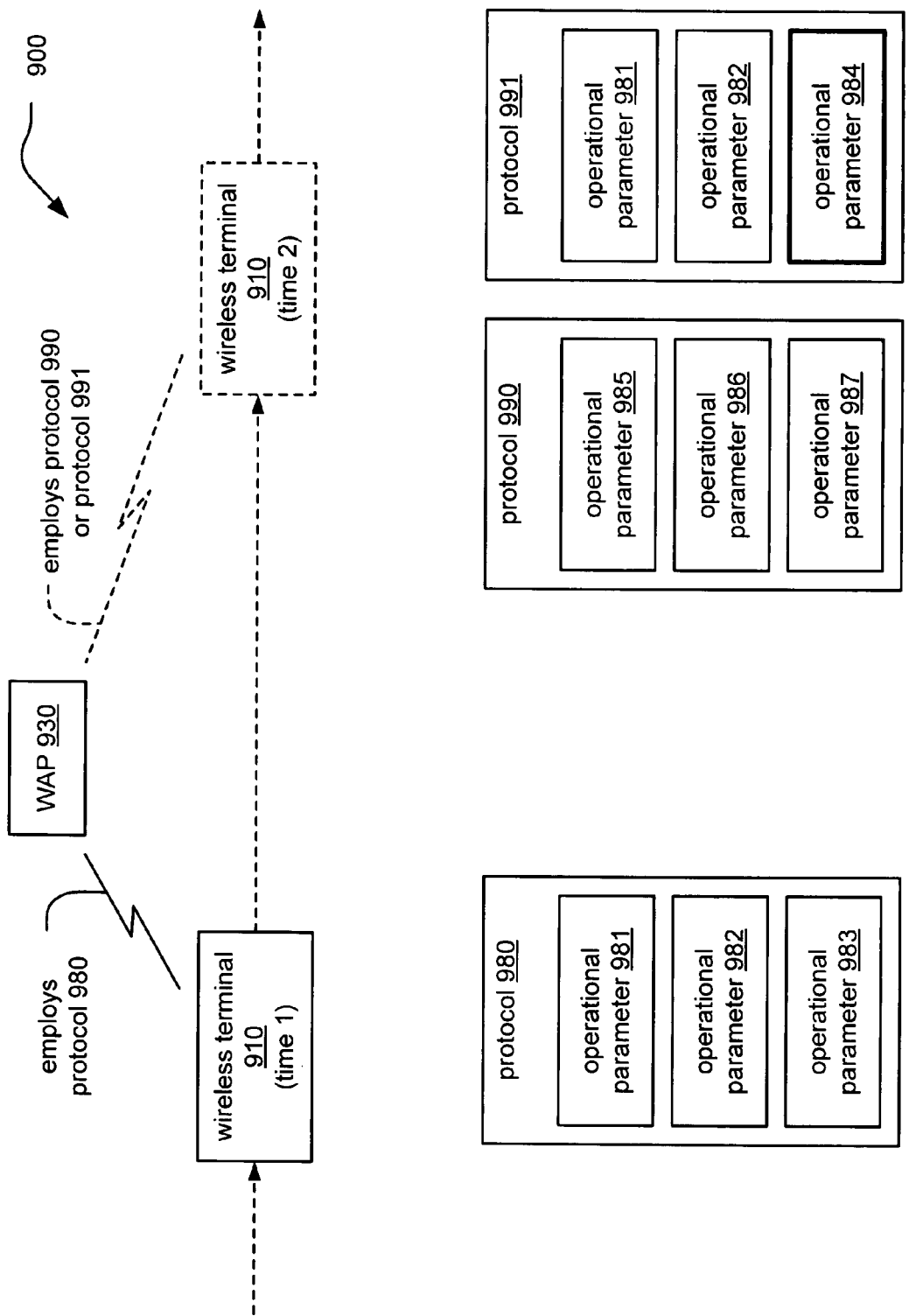
FIG. 9 is a diagram showing an embodiment of a communication system in which an apparatus employs a first protocol at a first time and a second protocol at a second time.

FIG. 9 is a diagram showing an embodiment of a communication system 900 in which an apparatus employs a first protocol at a first time and a second protocol at a second time. The apparatus can be either one of a wireless terminal 910 or a WAP 930.

Looking from the perspective of the wireless terminal 910, the communication between the wireless terminal 910 and the WAP 930 is governed using a first protocol (see reference numeral 980) at a first time, and the communication between the wireless terminal 910 and the WAP 930 is governed using a second protocol (see reference numeral 990 or 991) at a second time.

A protocol can include one or more operational parameters. As also described above, some examples of operational parameters include packet size, modulation type (e.g., QPSK, 8-PSK, 16 QAM, etc.), code rate, coding type (e.g., LDPC (Low Density Parity Check) coding, turbo coding, TCM (Trellis Coded Modulation), etc.), MIMO configuration parameters, beamforming parameters, or some other operational parameter such as with which standard the communication is being governed (e.g., according to IEEE 802.11, IEEE 802.16, or any variant thereof).

In this embodiment, the protocol 980 is shown to include operational parameter 981, operational parameter 982, and operational parameter 983. The protocol 990 is shown to include operational parameter 985, operational parameter 986, and operational parameter 987. The protocol 991 is shown to include operational parameter 981, operational parameter 982, and operational parameter 984.

The protocol 980 and the protocol 990 each include entirely different operational parameters. Therefore, the changing of the at least one operational parameter that governs communication between the wireless terminal 910 and the WAP 930 can either involve changing only one operational parameter or all operational parameters that govern communication there between. This embodiment also shows how the distinction between two protocols can be as little as only one operational parameter. Therefore, depending on the implementation, the at least one operational parameter which is changed can be viewed as switching only one operational parameter within an existing protocol or can be viewed as switching from one protocol to an entirely different protocol. This is dependent on the definition and content of each protocol, of course.

Figure 10:
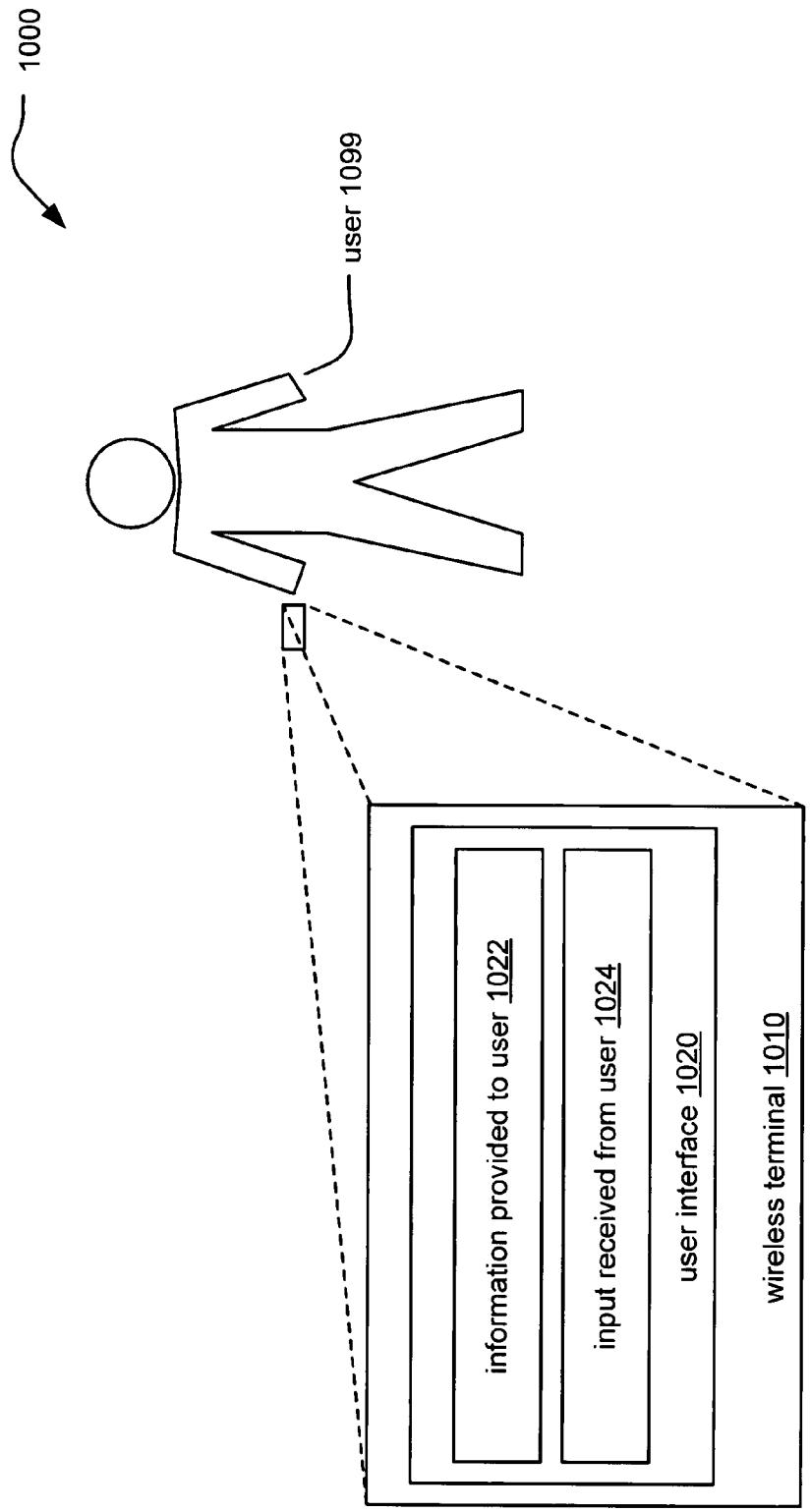
FIG. 10 is a diagram showing an embodiment of interfacing between a user and a wireless terminal.

FIG. 10 is a diagram showing an embodiment of interfacing 1000 between a user and a wireless terminal 1010. The wireless terminal 1010 includes a user interface 1020 that is operable to provide information to the user 1099 (as shown by reference numeral 1022) and is operable to receive input from the user 1099 (as shown by reference numeral 1024).

Through this user interface 1020, the user 1099 has the opportunity to program and select certain of the decision making means (e.g., thresholds with respect to various of the parameters considered) that are employed to characterize any particular WAP as an available WAP or an unavailable WAP. Also, the user 1099 has the opportunity to program and select certain of the decision making means by which one or more operational parameters is changed based on the mobility of the wireless terminal 1010 or a WAP to which the wireless terminal 1010 connect.

In addition, the user interface 1020 can be employed to display certain information to the user 1099, such as which WAPs are detected, which WAPs are available, which WAPs are deemed as being available, which WAPs are deemed as being unavailable, and so on. Even the information provided to the user 1099 via the user interface 1020 can be programmed or selected by the user 1099. For example, the user 1099 can select, via reference numeral 1024, that only available WAPs are displayed to the user 1099. For example, even if the wireless terminal 1010 detects a particular WAP, if that WAP does not meet the particular decision making criteria (e.g., such as the wireless terminal's mobility with respect to a WAP), then that particular WAP is not included within the plurality of available WAPs.

Any of a wide variety of types of a wireless terminal 1010 that is operable to connect to one or more types of WAPs can be employed in this embodiment, including PDAs, personal computers (including lap-top computers), other portable computer types, cell phones, and so on. Any wireless terminal 1010 that is operable to connect to one or more types of WAPs can include this interfacing 1000 to a user 1099. From this interfacing 1000, the user can then select any one or more of the constraints (e.g., thresholds) employed to make decisions regarding connecting to a particular WAP, and the user 1099 can be provided with any desired information such as whether a particular WAP is available or unavailable (according to the categorization being employed for the wireless terminal 1010). In addition, this information provided to the user 1099 can be provided in a format that has been selected by the user 1099.

FIG. 11, FIG. 12, FIG. 13, FIG. 14, and FIG. 15 are diagrams showing embodiments of methods for altering communication interface parameters based upon mobility of a wireless terminal.

Figure 11:
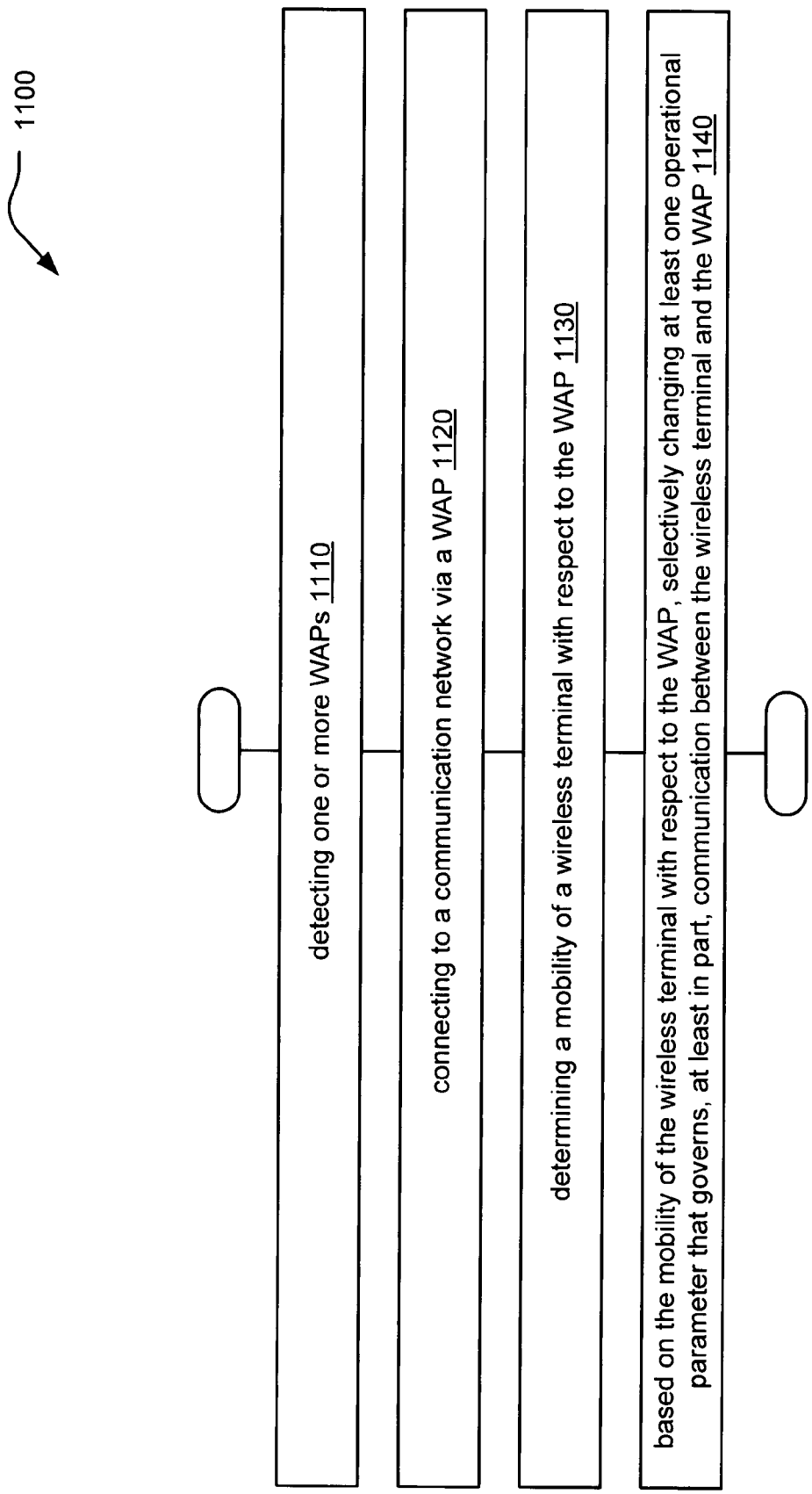
FIG. 11, FIG. 12, FIG. 13, FIG. 14, and FIG. 15 are diagrams showing embodiments of methods for altering communication interface parameters based upon mobility of a wireless terminal.

Referring to method 1100 of FIG. 11, the method 1100 involves detecting one or more WAPs as shown in a block 1110. Then, the method 1100 involves connecting to a communication network via one of the WAPs as shown in a block 1120. Thereafter, the method 1100 involves determining a mobility of a wireless terminal with respect to the WAP as shown in a block 1130. The method 1100 then involves selectively changing at least one operational parameter that governs, at least in part, communication between the wireless terminal and the WAP based on the mobility of the wireless terminal with respect to the WAP as shown in a block 1140.

Figure 12:
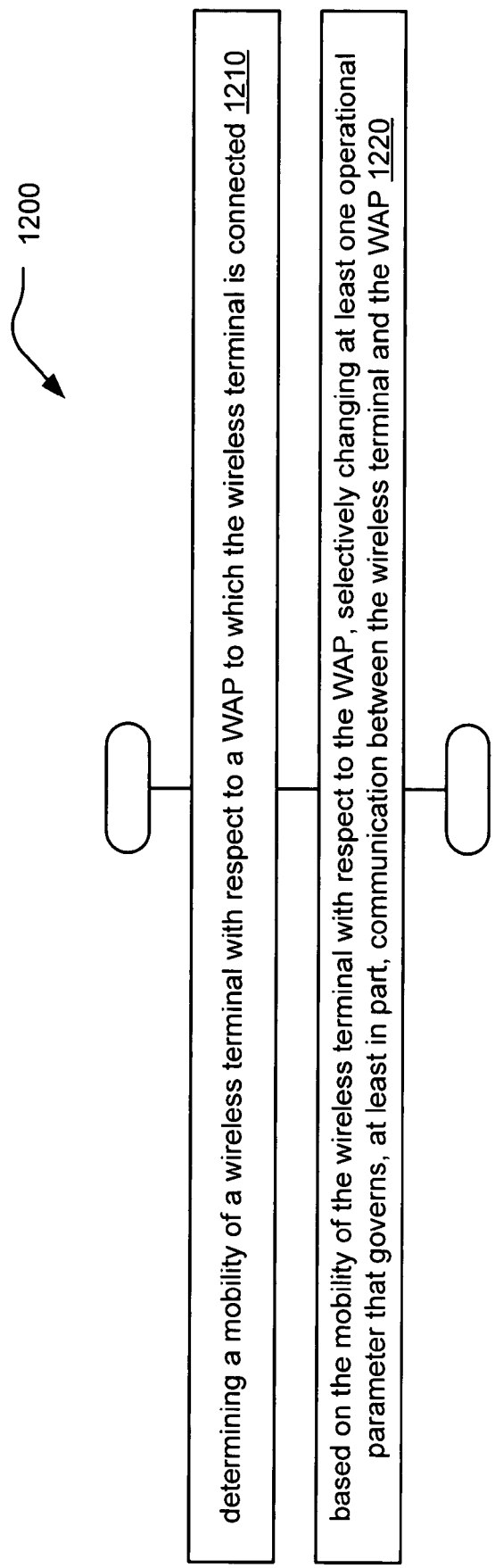

Referring to method 1200 of FIG. 12, the method 1200 involves determining a mobility of a wireless terminal with respect to the WAP to which the wireless terminal is connected as shown in a block 1210. The method 1200 then involves selectively changing at least one operational parameter that governs, at least in part, communication between the wireless terminal and the WAP based on the mobility of the wireless terminal with respect to the WAP as shown in a block 1220.

Figure 13:
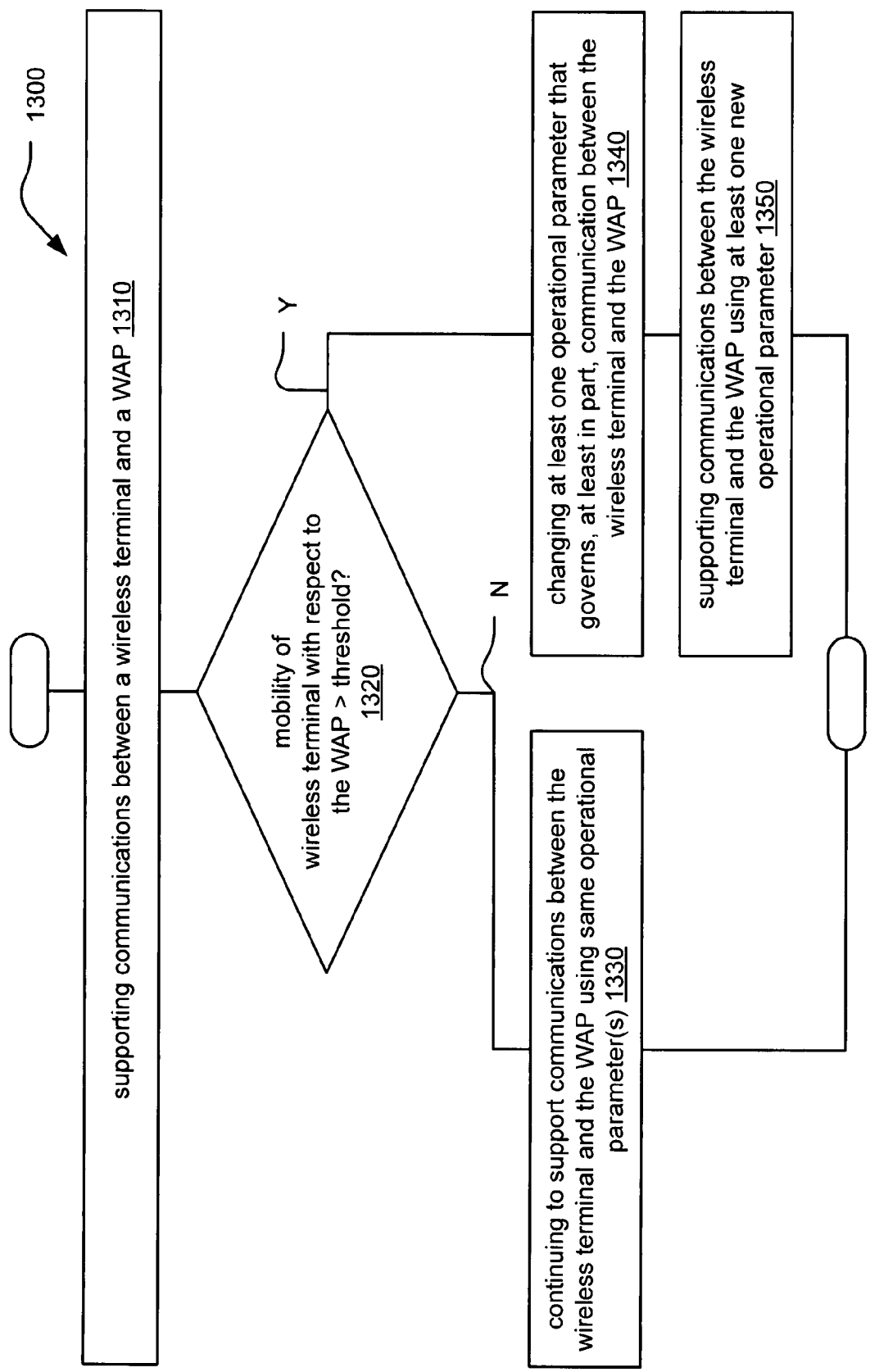

Referring to method 1300 of FIG. 13, the method 1300 involves supporting communications between a wireless terminal and a WAP as shown in a block 1310. The method 1300 then involves determining whether a mobility of the wireless terminal with respect to the WAP is greater than a threshold as shown in a decision block 1320. If the mobility of the wireless terminal with respect to the WAP is not greater than the threshold, then the method 1300 involves continuing to support communications between the wireless terminal and the WAP using the same one or more operational parameters as shown in a block 1330. Alternatively, if the mobility of the wireless terminal with respect to the WAP is greater than the threshold, then the method 1300 involves changing at least one operational parameter that governs, at least in part, communication between the wireless terminal and the WAP as shown in a block 1340. The method 1300 then involves supporting communications between the wireless terminal and the WAP using the at least one new operational parameter as shown in a block 1350.

Figure 14:
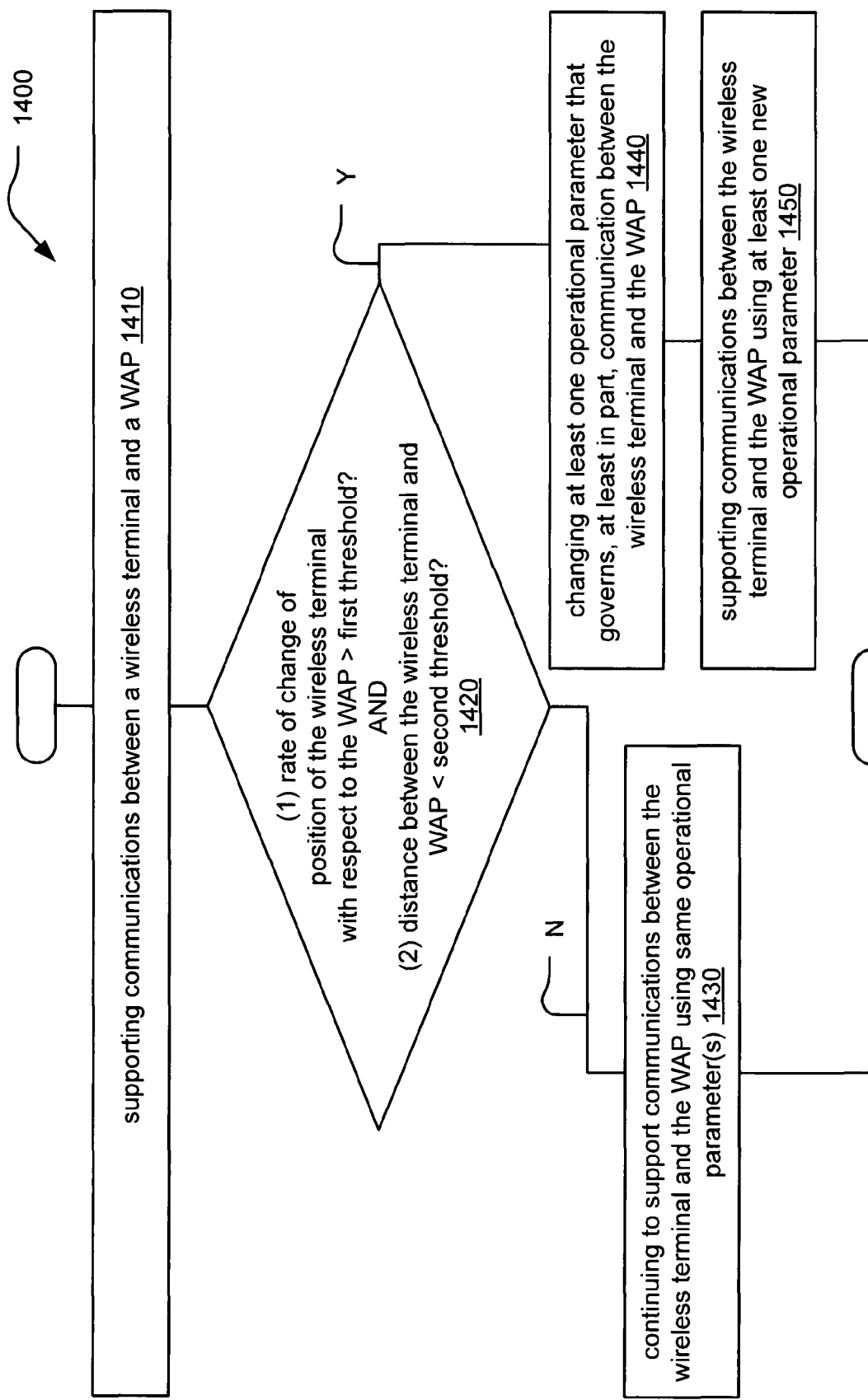

Referring to method 1400 of FIG. 14, the method 1340 involves supporting communications between a wireless terminal and a WAP as shown in a block 1410. The method 1400 then involves determining whether (1) a rate of change of position of the wireless terminal with respect to WAP is greater than a first threshold and whether (2) a distance between the wireless terminal and the WAP is less than a second threshold as shown in a decision block 1420.

If both the (1) rate of change of position of the wireless terminal with respect to WAP is not greater than the first threshold and the (2) distance between the wireless terminal and the WAP is not less than the second threshold, then the method 1400 involves continuing to support communications between the wireless terminal and the WAP using the same one or more operational parameters as shown in a block 1430.

Alternatively, if the (1) rate of change of position of the wireless terminal with respect to WAP is greater than the first threshold and the (2) distance between the wireless terminal and the WAP is less than the second threshold, then the method 1400 involves changing at least one operational parameter that governs, at least in part, communication between the wireless terminal and the WAP as shown in a block 1440. The method 1400 then involves supporting communications between the wireless terminal and the WAP using the at least one new operational parameter as shown in a block 1450.

Figure 15:
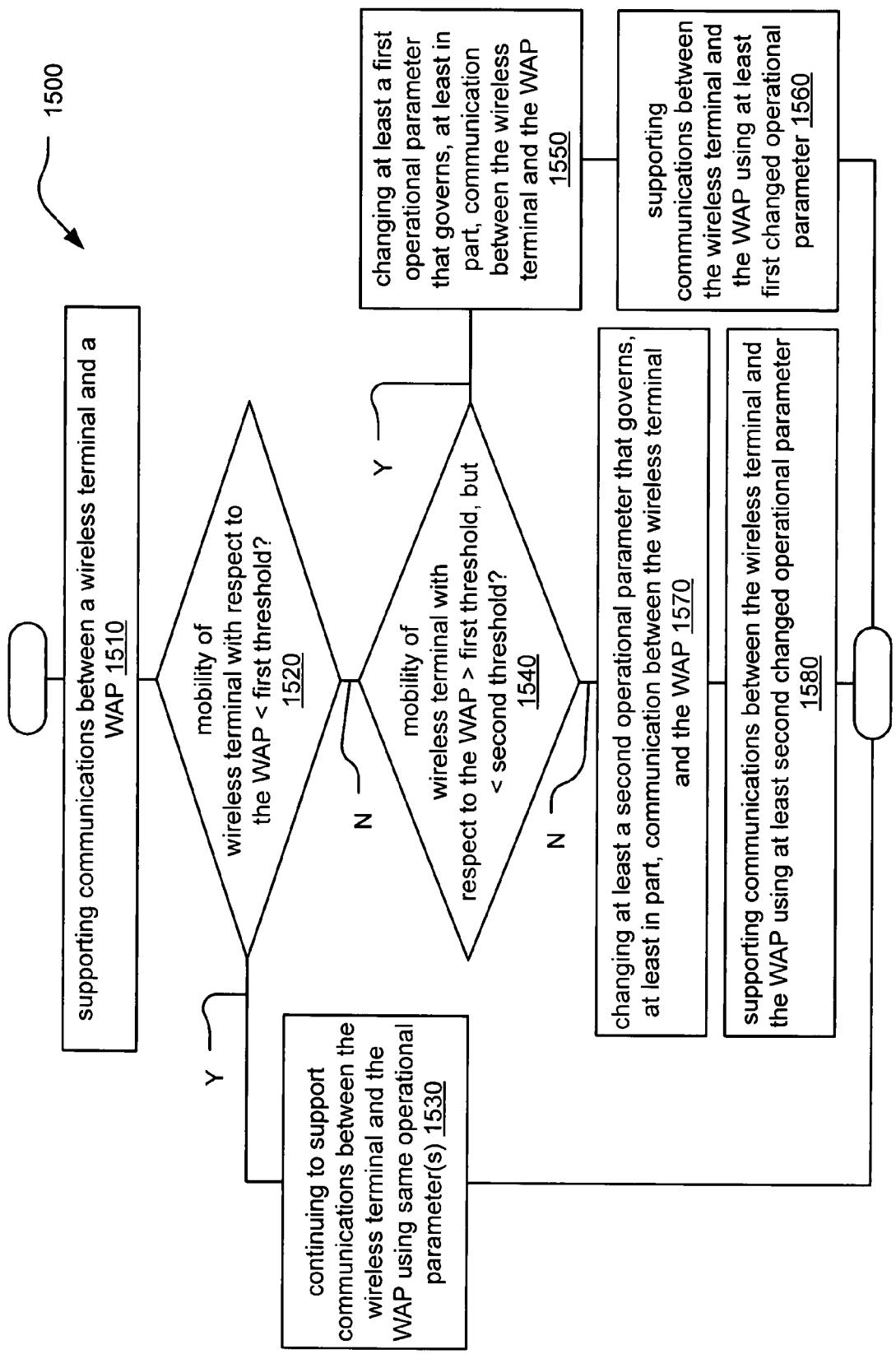

Referring to method 1500 of FIG. 15, the method 1500 involves supporting communications between a wireless terminal and a WAP as shown in a block 1510. Then, the method 1500 then involves determining whether a mobility of the wireless terminal with respect to the WAP is less than a first threshold as shown in a decision block 1520. If it is determined that the mobility of the wireless terminal with respect to the WAP is less than the first threshold, then the method 1500 involves continuing to support communications between the wireless terminal and the WAP using the same one or more operational parameters as shown in a block 1530. Alternatively, if it is determined that the mobility of the wireless terminal with respect to the WAP is not less than the first threshold, then the method 1500 involves determining whether the mobility of the wireless terminal with respect to the WAP is greater than the first threshold and less than a second threshold as shown in a decision block 1540 (i.e., the mobility is in between the first threshold and the second threshold).

If it is determined that the mobility of the wireless terminal with respect to the WAP is greater than the first threshold and less than the second threshold in the decision block 1540, then the method 1500 involves changing at least a first operational parameter that governs, at least in part, communication between the wireless terminal and the WAP as shown in a block 1550. The method 1500 then involves supporting communications between the wireless terminal and the WAP using the at least first changed operational parameter as shown in a block 1560.

Alternatively, if it is determined that the mobility of the wireless terminal with respect to the WAP is not greater than the first threshold and not less than the second threshold in the decision block 1540 (i.e., the mobility is then greater than the second threshold), then the method 1500 involves changing at least a second operational parameter that governs, at least in part, communication between the wireless terminal and the WAP as shown in a block 1570. The method 1500 then involves supporting communications between the wireless terminal and the WAP using the at least second changed operational parameter as shown in a block 1580.

Clearly, the mobility of the wireless terminal can be compared to even more thresholds as well such that selective changing of certain operational parameters is performed based on the mobility of the wireless terminal.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A wireless terminal in a communication network, the communication network including a plurality of WAPs (Wireless Access Points), the wireless terminal comprising:
a radio operable to:
  detect the plurality of WAPs;
  select a first WAP from the plurality of WAPs;
  support a first communication link via connectivity with the first WAP in accordance with a first communication protocol; and
  determine mobility of the wireless terminal corresponding to a distance and a rate of change of the wireless terminal with respect to the first WAP or a second WAP;
  when the mobility of the wireless terminal exceeds a threshold, select the second WAP from the plurality of WAPs, switch connectivity, via a change to an operational parameter of the first communication link, from the first communication link to a second communication link having connectivity with the second WAP, and support the second communication link via connectivity with the second WAP in accordance with a second communication protocol, wherein the first WAP or the second WAP and the wireless terminal operative cooperatively to select the change to the operational parameter;
a user interface operable to provide information to and receive input from a user; wherein the wireless terminal operable to:
  provide information to the user via the user interface indicating that the mobility of the wireless terminal with respect to the first WAP or the second WAP exceeds the threshold, wherein the user selects the threshold as relating to the mobility of the wireless terminal; and
  present an operational parameter change authorization request to the user via the user interface to authorize changing of the operational parameter.

2. The wireless terminal of claim 1, wherein:
the first WAP being a wireless local area network access point compatible with IEEE 802.11 standard; and
the second WAP being a WiMAX access point compatible with IEEE 802.16 standard.

3. The wireless terminal of claim 1, wherein:
the radio operative to switch from the first communication link or the second communication link to at least one additional communication link with at least one additional WAP, selected from the plurality of WAPs, based on a change in the mobility of the wireless terminal.

4. The wireless terminal of claim 1, wherein:
the first communication protocol includes a first plurality of operational parameters; and
the second communication protocol includes a second plurality of operational parameters.

5. The wireless terminal of claim 1, wherein:
the mobility of the wireless terminal with respect to the first WAP or the second WAP being a velocity or an acceleration.

6. The wireless terminal of claim 1, wherein:
the threshold being a first threshold;
at a first time, there exists a first distance between the wireless terminal and the first WAP or the second WAP; and
when the mobility of the wireless terminal with respect to the first WAP or the second WAP being less than the first threshold and a second distance between the wireless terminal and the first WAP or the second WAP being greater than a second threshold at a second time, the radio being operable to switch from the first communication link to the second communication link with the second WAP selected from the plurality of WAPs that supports communication in accordance with the second communication protocol.

7. The wireless terminal of claim 1,
wherein:
the radio operable automatically to change a plurality of operational parameters that governs, at least in part, communication between the radio and the first WAP or the second WAP when the user does not respond to the operational parameter change authorization request within a period of time.

8. The wireless terminal of claim 1, wherein:
the threshold being a first threshold; and
when the mobility of the wireless terminal with respect to the first WAP being greater than a second threshold, the radio being operable to switch its connectivity from the first WAP to the second WAP.

9. The wireless terminal of claim 1, further comprising:
a GPS (Global Positioning System) module operable to:
  identify a first location of the wireless terminal on Earth at a first time; and
  identify a second location of the wireless terminal on Earth at a second time; and
wherein:
the wireless terminal operable to receive information from the first WAP or the second WAP indicating a location of the first WAP or the second WAP on Earth; and
the wireless terminal employs information provided by the GPS module and information corresponding to the location of the first WAP or the second WAP on Earth to determine the mobility of the wireless terminal with respect to the first WAP or the second WAP.

10. The wireless terminal of claim 1, wherein:
the wireless terminal operable to transmit first information to the first WAP;
the first WAP operable to transmit second information to the radio; and
based on at least one of a first period of time corresponding to transmission of the first information and a second period of time corresponding to transmission of the second information, the first WAP or the wireless terminal operable to determine a relative distance between the first WAP and the wireless terminal.

11. The wireless terminal of claim 1, wherein:
the first WAP or the second WAP directs the radio of the wireless terminal to change a plurality of operational parameters that governs, at least in part, communication between the radio and the first WAP or the second WAP.

12. A wireless terminal in a communication network, the communication network including a plurality of WAPs (Wireless Access Points), the wireless terminal comprising:
a radio operable to:
  detect the plurality of WAPs;
  select a first WAP from the plurality of WAPs based on a location of the wireless terminal on Earth, a mobility of the wireless terminal corresponding to a distance and a rate of change with respect to the first WAP, a signal strength, and a communication link quality supported by a first communication link between the radio and the first WAP;
  support the first communication link via connectivity with the first WAP in accordance with a first communication protocol; and
  determine whether a change of the location, the mobility, the signal strength, and the communication link quality exceed a threshold;
  when the change of the location, the mobility, the signal strength, and the communication link quality exceed the threshold, select a second WAP from the plurality of WAPs, switch connectivity, via a change to an operational parameter of the first communication link, from the first communication link to a second communication link having connectivity with the second WAP, and support the second communication link via connectivity with the second WAP in accordance with a second communication protocol, wherein the first WAP or the second WAP and the wireless terminal operative cooperatively to select the change to the operational parameter; and
a GPS (Global Positioning System) module operable to determine the location of the wireless terminal on Earth and the mobility of the wireless terminal relative to the first WAP within the plurality of WAPs; and
a user interface operable to provide information to and receive input from a user; wherein the wireless terminal is operable to:
  provide information to the user via the user interface indicating that the mobility of the wireless terminal with respect to the first WAP or the second WAP exceeds the threshold, wherein the user selects the threshold as relating to the mobility of the wireless terminal; and
  present an operational parameter change authorization request to the user via the user interface to authorize changing of the operational parameter.

13. The wireless terminal of claim 12, wherein:
the first WAP being a wireless local area network access point compatible with IEEE 802.11 standard; and
the second WAP being a WiMAX access point compatible with IEEE 802.16 standard.

14. The wireless terminal of claim 12, wherein:
the first communication protocol includes a first plurality of operational parameters; and
the second communication protocol includes a second plurality of operational parameters.

15. The wireless terminal of claim 12, wherein:
the wireless terminal operable to support communication in accordance with each of a plurality of communication protocols including the first communication protocol and the second communication protocol.

16. The wireless terminal of claim 12, wherein:
when the mobility of the wireless terminal with respect to the first WAP or the second WAP being greater than a threshold, the radio switches from the first communication link to the second communication link with the second WAP that supports communication in accordance with the second communication protocol.

17. The wireless terminal of claim 12, wherein:
the mobility of the wireless terminal includes information corresponding to at least one of a velocity of the wireless terminal and a location of the wireless terminal within the communication network.

18. The wireless terminal of claim 12, wherein:
the first WAP or the second WAP directs the radio of the wireless terminal to change a plurality of operational parameters that governs, at least in part, communication between the radio and the first WAP or the second WAP.

19. A method performed by a wireless terminal in a communication network, the communication network including a plurality of wireless access points (WAPs), the method comprising:
detecting the plurality of WAPs;
selecting a first WAP from the plurality of WAPs;
supporting a first communication link via connectivity with the first WAP in accordance with a first communication protocol;
determining a mobility of the wireless terminal corresponding to a distance and a rate of change of the wireless terminal with respect to the first WAP or a second WAP;
when the mobility of the wireless terminal exceeds a threshold, selecting the second WAP from the plurality of WAPs, switching connectivity, via changing an operational parameter of the first communication link based upon an authorization of a user of the wireless terminal responsive to an operational parameter change authorization request to the user, of the wireless terminal from the first communication link to a second communication link having connectivity with the second WAP, and supporting the second communication link via connectivity with the second WAP in accordance with a second communication protocol, wherein the first WAP or the second WAP and the wireless terminal operative cooperatively to select the change to the operational parameter;

providing information to the user via a user interface indicating that the mobility of the wireless terminal with respect to the first WAP or the second WAP exceeds the threshold, wherein the user selects the threshold as relating to the mobility of the wireless terminal; and presenting an operational parameter change authorization request to the user via the user interface to authorize changing of the operational parameter.

20. The method of claim 19, wherein:
the mobility of the wireless terminal includes information corresponding to at least one of a velocity of the wireless terminal and a location of the wireless terminal within the communication network.

21. The method of claim 19, wherein:
the first WAP being a wireless local area network access point compatible with IEEE 802.11 standard; and
the second WAP being a WiMAX access point compatible with IEEE 802.16 standard.

22. The method of claim 19, wherein:
the first communication protocol includes a first plurality of operational parameters; and
the second communication protocol includes a second plurality of operational parameters.

23. The method of claim 19, wherein:
the wireless terminal operable to support communication in accordance with each of a plurality of communication protocols including the first communication protocol and the second communication protocol.

24. The method of claim 19, wherein:
the threshold being a first threshold; and
when the mobility of the wireless terminal with respect to the first WAP or the second WAP being greater than a second threshold, selectively switching connectivity of the wireless terminal from the first communication link to the second communication link having connectivity with the second WAP and supporting the second communication link via connectivity with the second WAP in accordance with a second communication protocol.

25. The method of claim 19, further comprising:
employing the first WAP or the second WAP to direct a radio of the wireless terminal to change a plurality of operational parameters that governs, at least in part, communication between the radio and the first WAP or the second WAP.

26. The method of claim 19, further comprising:
cooperatively employing the first WAP or the second WAP and the wireless terminal to select a change of a plurality of operational parameters that governs, at least in part, communication between a radio and the first WAP or the second WAP.

* * * * *